US011568632B1

(12) United States Patent
Raghavan et al.

(10) Patent No.: US 11,568,632 B1
(45) Date of Patent: *Jan. 31, 2023

(54) ITEM IDENTIFICATION AMONG A VARIANT OF ITEMS

(71) Applicant: Amazon Technologies, Inc., Seattle, WA (US)

(72) Inventors: Sudarshan Narasimha Raghavan, Snoqualmie, WA (US); Xiaofeng Ren, Yarrow Point, WA (US); Michel Leonard Goldstein, Seattle, WA (US); Ohil K. Manyam, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/013,207

(22) Filed: Sep. 4, 2020

Related U.S. Application Data

(63) Continuation of application No. 16/520,861, filed on Jul. 24, 2019, now Pat. No. 10,769,488, which is a continuation of application No. 14/031,798, filed on Sep. 19, 2013, now Pat. No. 10,366,306.

(51) Int. Cl.
*G06V 20/52* (2022.01)
*G06V 10/75* (2022.01)

(52) U.S. Cl.
CPC ............ *G06V 10/751* (2022.01); *G06V 20/52* (2022.01)

(58) Field of Classification Search
None
See application file for complete search history.

(56) References Cited

U.S. PATENT DOCUMENTS

| 5,930,771 | A | 7/1999 | Stapp |
| 6,601,764 | B1 | 8/2003 | Goodwin, I |
| 7,168,618 | B2 * | 1/2007 | Schwartz ................. G07F 7/00 235/383 |
| 7,225,980 | B2 | 6/2007 | Ku et al. |
| 7,769,221 | B1 | 8/2010 | Shakes et al. |

(Continued)

FOREIGN PATENT DOCUMENTS

| KR | 20070103482 A | 10/2007 |
| KR | 20080036518 A | 4/2008 |
| KR | 101435457 | 8/2014 |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Tsung Yin Tsai
(74) *Attorney, Agent, or Firm* — Athorus, PLLC

(57) ABSTRACT

This disclosure describes a system for automatically identifying an item from among a variation of items of a same type. For example, an image may be processed and resulting item image information compared with stored item image information to determine a type of item represented in the image. If the matching stored item image information is part of a cluster, the item image information may then be compared with distinctive features associated with stored item image information of the cluster to determine the variation of the item represented in the received image.

20 Claims, 8 Drawing Sheets

(56) References Cited

U.S. PATENT DOCUMENTS

| | | | |
|---|---|---|---|
| 7,949,568 B2 | 5/2011 | Fano et al. | |
| 8,009,864 B2* | 8/2011 | Linaker | G06V 20/10 |
| | | | 382/103 |
| 8,091,782 B2 | 1/2012 | Cato et al. | |
| 8,175,925 B1 | 5/2012 | Rouaix | |
| 8,189,855 B2* | 5/2012 | Opalach | G06Q 10/087 |
| | | | 382/209 |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 10,242,393 B1* | 3/2019 | Kumar | G06Q 30/0633 |
| 10,268,984 B1 | 4/2019 | Ramoji et al. | |
| 10,296,814 B1* | 5/2019 | Kumar | G06K 9/6267 |
| 10,353,982 B1* | 7/2019 | Kumar | G06F 17/00 |
| 10,366,306 B1* | 7/2019 | Raghavan | G06V 10/751 |
| 10,699,421 B1* | 6/2020 | Cherevatsky | G06K 9/623 |
| 10,891,736 B1* | 1/2021 | Hua | G06T 7/251 |
| 2002/0143672 A1* | 10/2002 | Sawasaki | G06Q 10/087 |
| | | | 705/29 |
| 2003/0002712 A1 | 1/2003 | Steenburgh et al. | |
| 2003/0013951 A1 | 1/2003 | Stefanescu et al. | |
| 2003/0154141 A1 | 8/2003 | Capazario et al. | |
| 2004/0181467 A1 | 9/2004 | Raiyani et al. | |
| 2007/0103482 A1 | 5/2007 | Yoshiura et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0010484 A1 | 1/2009 | Amidi | |
| 2009/0060259 A1* | 3/2009 | Goncalves | G07G 1/12 |
| | | | 382/100 |
| 2009/0121017 A1 | 5/2009 | Cato et al. | |
| 2009/0160975 A1 | 6/2009 | Kwan | |
| 2009/0245573 A1 | 10/2009 | Saptharishi et al. | |
| 2011/0011936 A1 | 1/2011 | Morandi et al. | |
| 2011/0076266 A1 | 3/2011 | Gallo Barraco | |
| 2012/0284132 A1 | 11/2012 | Kim et al. | |
| 2013/0076898 A1* | 3/2013 | Philippe | G06V 40/70 |
| | | | 348/143 |
| 2013/0163851 A1 | 6/2013 | Dalla-Torre et al. | |
| 2013/0235206 A1 | 9/2013 | Smith et al. | |
| 2013/0253700 A1 | 9/2013 | Carson et al. | |
| 2014/0279294 A1 | 9/2014 | Field-Darragh et al. | |
| 2015/0012396 A1* | 1/2015 | Puerini | G06V 20/52 |
| | | | 705/28 |
| 2015/0019391 A1 | 1/2015 | Kumar et al. | |
| 2015/0073907 A1 | 3/2015 | Purves et al. | |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

ITEM IDENTIFICATION AMONG A VARIANT OF ITEMS

PRIORITY CLAIM

This application is a continuation of U.S. patent application Ser. No. 16/520,861, filed Jul. 24, 2019, and titled "Item Variation Management," which is a continuation of U.S. Pat. No. 10,366,306, filed Sep. 19, 2013, and titled "Item Identification Among Item Variations," the contents of both of which are incorporated by reference herein in their entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g. shopping area) and customers can locate items from within the store, pick the items from inventory and take them to a cashier for purchase, rental, etc.

In many instances, the materials handling facility may maintain similar items. For example, the materials handling facility may maintain items of the same type (e.g., soup, salad dressing, books of a series) that come from the same manufacturer. In many of these situations, the items share a common appearance, with the only visual difference being a description of the variation between the items. For example, the manufacturer Campbell's® may provide cans of soup (an item type) with many different variations (e.g., Cream of Chicken, Mushroom, Chicken Noodle). The only visual difference between the similar items is the description of the variations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
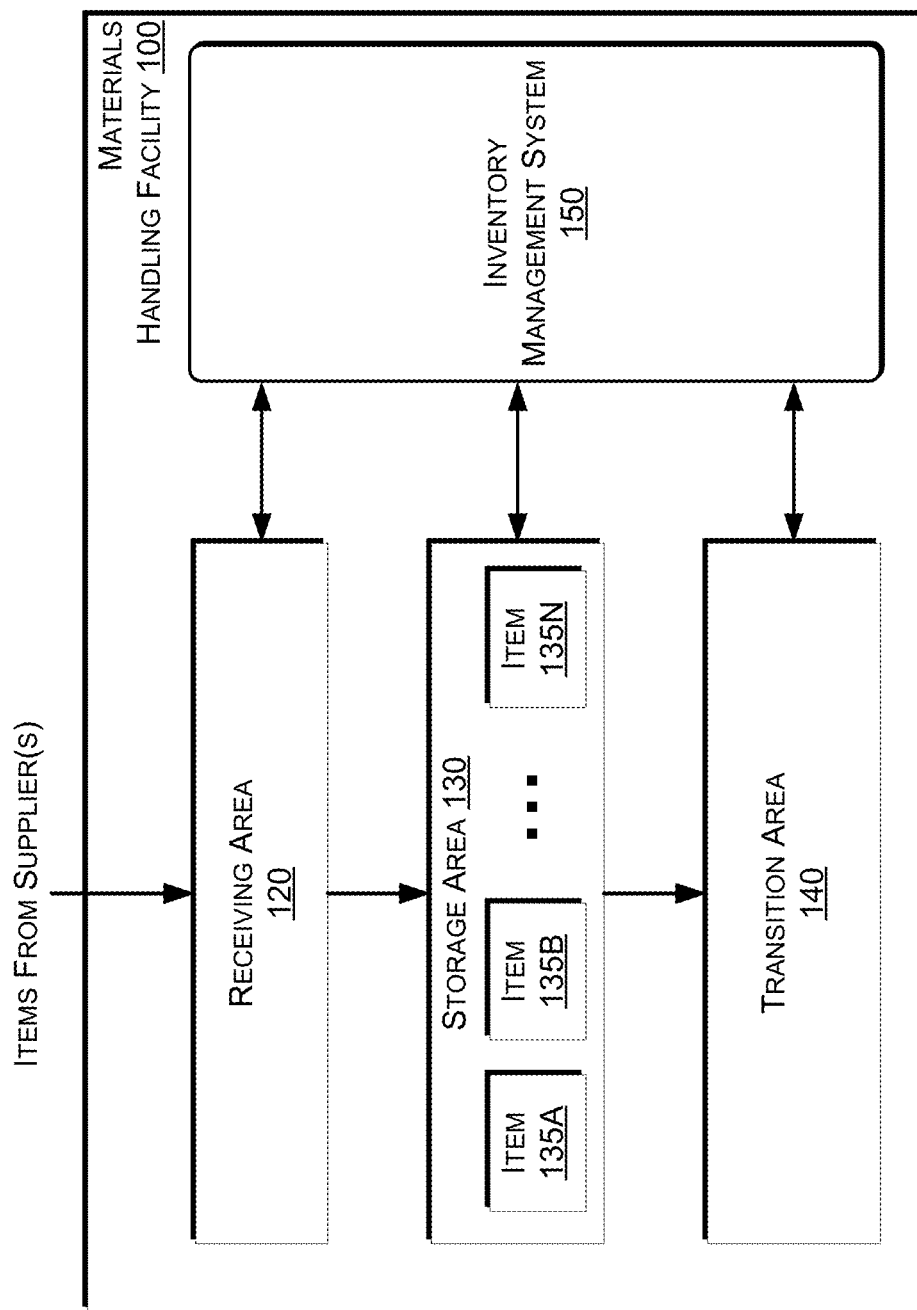
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for processing an image of an item and correctly identifying the item from a group of visually similar items. In one implementation, as item image information for a new item is added to an item images data store, a determination is made as to whether the item image information is similar to stored item image information. If the item image information for the new item is similar to stored item image information, the item image information and the stored item image information are grouped into a cluster. A cluster, or set, is a group of two or more images and/or item image information that are associated because the images have been identified as similar. For example, a cluster may exist for different variations of soup cans (e.g., Chicken Noodle, Split Pea, Cream of Corn) from the same manufacturer because the images are similar. In this example, the images are identified as similar because the only visually distinguishable features of the soup cans are the descriptions of the variations. Item image information of a cluster may then be compared to identify common features of the item images. The remaining features of each image of the cluster may then be identified as the distinctive features for each item of the cluster.

When an image of an item is received, the image is processed and item image information is created for the item. The item image information for the received image may then be compared with stored item image information. If the comparison results in the item image information being correlated with stored item image information that is associated with a cluster, the item image information for the received image may then be compared to distinctive features associated with stored item image information that is associated with the cluster. By comparing item image information of the received image with distinctive features associated with stored item image information of a cluster, the common features are removed as they do not provide discriminating information within the cluster. As a result, the appropriate variation of an item can be identified.

An implementation of a materials handling facility configured to store and manage inventory items is illustrated in FIG. 1. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and/or transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a user orders or retrieves one or more of the items. The general flow of items through the materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location, images or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

In addition to arranging items, in some implementations, one or more images of the items may be captured as part of receiving. For example, the receiving area 120 may include cameras that capture images of the items as they are unpacked and/or otherwise prepared for storage. These images may be provided to and processed by the inventory management system 150 to identify features of the items and to determine an arrangement of those features. Features may be any identifying information included in the item (e.g., size, shape, color, wording, graphics). If the item is already known to the inventory management system 150 (e.g., inventory is already stored in the storage area) the processed item image information may be compared with item image information maintained in the item images data store to confirm that the item can be identified based on the captured image. If the item can be identified, the receive process can be completed and the item transitioned to the storage area 130.

However, if the item cannot be identified from the captured images and/or if the item is not previously known to the inventory management system 150, the processed item image information may be associated with the item and stored in the item images data store. A determination may also be made as to whether the arrangement of features included in the item image information are similar to the arrangement of features of one or more of the stored item image information. As discussed below, an arrangement of features may be a two dimensional relationship of the features with respect to each other as captured in the representative image. In other implementations, the arrangement of features may be a three-dimensional arrangement with respect to each other as captured in the representative image. If the arrangement of features are similar to arrangement of features of one or more stored item image information, a cluster may be formed that includes the item image information and the similar stored item image information. Common features among item image information in a cluster may be identified and suppressed. The remaining features of each item image information may be identified as distinctive features for the item image information and used to distinguish between images of items that are similar, as discussed in further detail below.

After arriving through receiving area 120, items 135 may be stored within storage area 130. In some implementations, like items 135 may be stored or displayed together in bins, on shelves or via other suitable storage mechanisms, such that all items 135 of a given kind are stored in one inventory location within the storage area 130. For example, different variations of the same type of item may be stored in one inventory location within the storage area 130. In other implementations, like items 135 may be stored in different locations. For example, to optimize retrieval of certain items 135 having high turnover within a large physical facility, those items 135 may be stored in several different inventory locations to reduce congestion that might occur at a single point of storage. In general, the inventory management system 150 may maintain a mapping or location information identifying where within the materials handling facility each item is stored. Each inventory item may be associated with the corresponding inventory location in which it is stored and the association may be maintained in an inventory data store 715 (FIG. 7) accessible by the inventory management system 150.

When an order specifying one or more of the items 135 is received, or as a user progresses through the materials handling facility 100, the corresponding items 135 may be selected or "picked" from inventory locations within the storage area 130. For example, in one implementation a user may have a list of items to pick and may progress through the materials handling facility picking items 135 from the inventory locations within the storage area 130. In other implementations, materials handling facility employees may pick items 135 from inventory locations within the storage area 130 using written or electronic pick lists derived from customer orders.

As discussed in more detail below, one or more images of the item may be captured as the item is picked from the storage area 130. For example, when the user reaches an inventory location and passes their hand into an inventory location within the storage area 130, one or more images of the item may be captured as the user removes the item from the inventory location. Those images may be processed to identify and/or verify the identity of the item retrieved by the user. In some implementations, item identification and/or the type of item may be determined based on the inventory location from which the user retrieved the item. The image processing may be performed to confirm that the item associated with the inventory location actually corresponds with the retrieved item and/or to determine which variation of an item type has been picked. In other implementations, the item may be identified based on actions of the user. For example, an identification of the item as determined by the inventory location or other means (e.g., bar code, QR code, bokode, RFID, or other visual code) may be presented to the user. If the user confirms the items identity, places the item in a tote, or otherwise acknowledges the identity of the item, such user action may be used to identify, or confirm the identity of the item.

To further illustrate, the item associated with the inventory location may initially be determined as the item retrieved by the user. Images are captured of the item as it is retrieved and processed to identify features for the item. Once the features have been identified, the arrangement of those features is compared with stored item image information maintained in the item images data store for the item associated with the inventory location and a correlation score determined for each comparison. If there is not a high correlation score between the arrangement of features and one or more of the stored item image information, or if none of the correlation scores satisfy a confidence threshold, the arrangement of features identified from the processed image may be compared with item image information maintained in the item images data store associated with other items.

If a higher correlation score is determined for another item, it may be determined that the actually retrieved item is not the item associated with the inventory location. In addition, if the stored item image information with the highest correlation score is part of a cluster (discussed further below), the arrangement of features may be compared with the distinctive features of each stored item image information to determine which item has been selected from a variation of different product types.

In some instances, the user may be asked to confirm the identity of the item. For example, the identity of the item may be presented on a nearby display, projected onto a nearby surface and/or presented on a portable device accessible to the user. The resulting user action may be used to confirm the identity of the item. For example, if the user acknowledges the identity of the item as presented to the user, the item identity is confirmed. As another example, even if the user does not specifically acknowledge the identity of the item but performs another positive action, such as placing the item in a tote or keeping the item, the user's action can be used to confirm the identity of the item.

Figure 2:
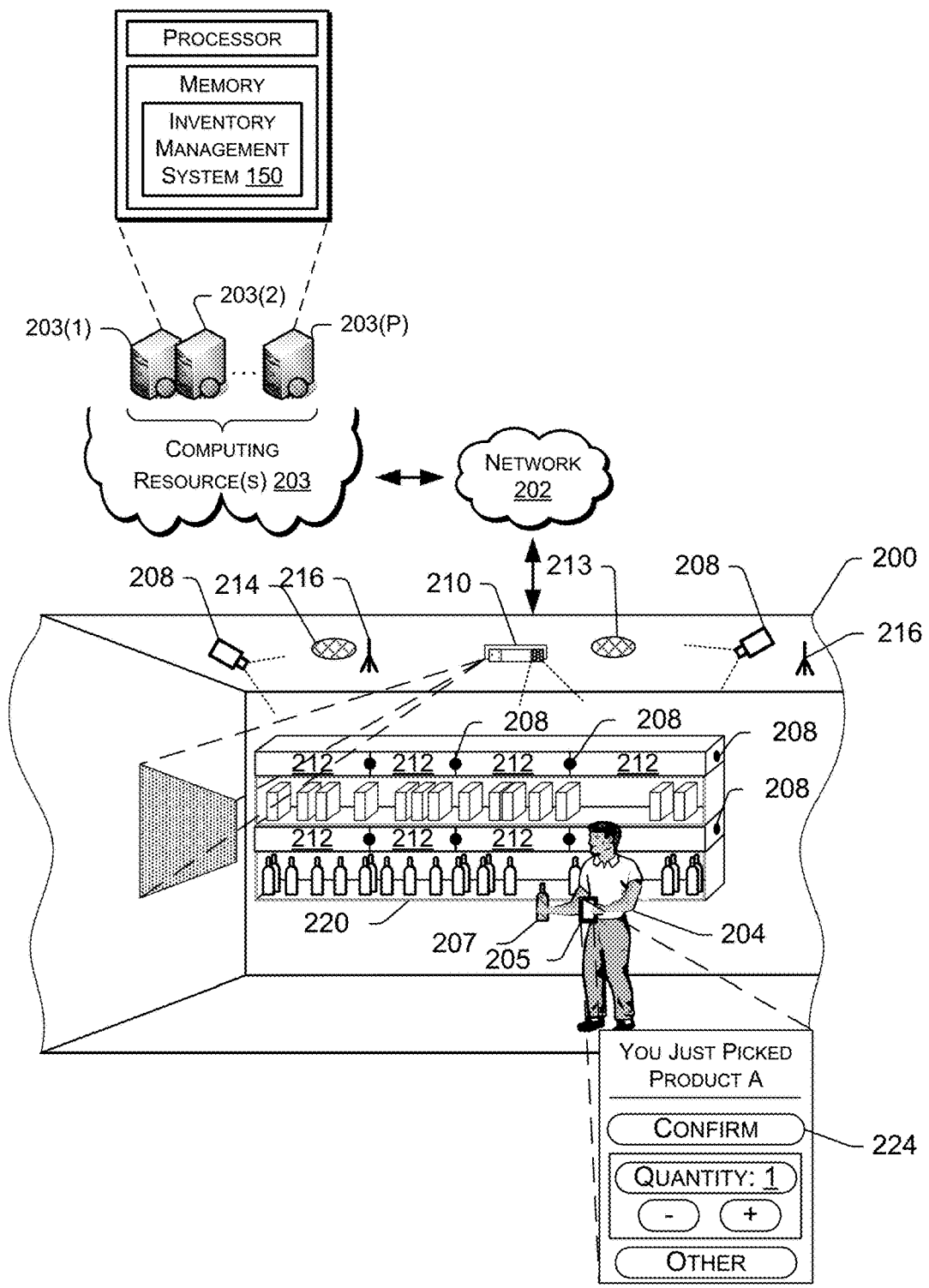
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of items and/or users within the materials handling facility can be captured. In some implementations, the image capture devices 208 may be positioned overhead, such as on the ceiling to capture images of users, locations within the materials handling facility and/or items within the materials handling facility. In addition, in some implementations, one or more cameras 208 may be positioned on or inside of inventory locations 220. For example, a series of cameras 208 may be positioned on external portions of the inventory locations 220 and positioned to capture images of users, the location surrounding the inventory location 220 and/or items as they are placed into the inventory location or removed from the inventory location. Likewise, one or more cameras 208 may be positioned within the inventory locations 220 to capture images of items stored in the inventory locations 208 and/or images of objects (e.g., items, hands) moving into and/or out of the inventory locations 208.

Any type of camera and/or configuration of cameras may be used with the implementations described herein. For example, one or more of the cameras may be RGB cameras. In other implementations, one or more of the cameras may be depth sensing cameras.

In addition to camera's, other input devices, such as pressure sensors, infrared sensors, a scale, a volume displacement sensor, a light curtain, radio frequency identifier ("MID") tag scanner, visual code reader (e.g., barcode reader, bokode reader, QR code reader), etc. may be utilized with the implementations described herein. For example, a pressure sensor and/or a scale may be used to detect when an item is added and/or removed from inventory locations. Likewise, an infrared sensor may be used to distinguish between a user's hand and inventory items. In still other implementations, a visual code or tag may be located on the items such that the items can be identified by a visual code reader.

In some implementations, a user 204 located in the materials handling facility 200 may possess a portable device 205 and obtain information about items 207 located within the materials handling facility 200 via the portable device. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user, communicate with the user via other means and/or communicate with other components of the inventory management system 150.

The inventory management system 150 may also include other input/output devices, such as projectors 210, displays 212, speakers 213, microphones 214, etc, to facilitate communication between the inventory management system 150 and the user 204. In some implementations, multiple input/output devices may be distributed within the materials handling facility. Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s) 203 that may be local to the environment (e.g., materials handling facility), remote from the environment, or any combination thereof.

The inventory management system 150 may utilize antennas 216 within the materials handling facility to create a local wireless network 202 (e.g., Wi-Fi) so that the portable device 205 can connect to and communicate with the inventory management system 150. Likewise, in instances when one or more of the components of the inventory management system 150 are remote from the materials handling facility, they may communicate with other components of the inventory management system 150 and/or the portable device 205 via the network 202.

The following is an example use case for automatically determining the variation of an item as an item is removed from an inventory location 220 and identified. In some implementations, when the user 204 retrieves an item from an inventory location 220 within the storage area 130 of the materials handling facility 200, one or more image capture devices 208 may obtain/capture one or more images of the item as it is retrieved and provide the image(s) to the computing resource(s) 203 for processing. For example, if the user retrieves an item 207, image capture devices 208 that have a visual line-of-sight with the item 207 capture images of the item 207 as it retrieved from the inventory location 220 by the user 204. The captured images are provided to the computing resources 203 and processed by the inventory management system 150 to identify features of the item included in the captured images. Once all features of the item included in the captured images are identified, an arrangement of those features is determined. In some implementations, the images are processed in grey-scale to identify features and determine an arrangement of those features. The features and arrangement of features are included in the item image information for the image.

As the images are processed, the processed item image information is compared with item image information maintained in the item images data store to determine an image correlation. For example, the item images data store may maintain multiple sets of item image information, each of which may include an arrangement of features, for multiple inventory items within the materials handling facility. An image matching algorithm, such as Scale-Invariant Feature Transformation (SIFT), Principal Component Analysis (PCA)-SIFT, or Speeded Up Robust Features (SURF), and/or Image Match algorithms may be utilized alone or in combination to compare the arrangement of features of the processed image with the stored item image information to determine the correlation of the feature arrangements. In one implementation, each inventory item may have multiple images and corresponding item image information associated therewith that is maintained in the item images data store. When a new image is processed, the arrangement of the identified features may be compared with one or more of the stored item image information for one or more of the inventory items to determine how well the item image information for the captured image compares with stored item image information, and a correlation score determined.

The correlation scores identify how similar the arrangement of features identified from the processed image is to the arrangement of features included in each of the stored item image information. The stored item image information with the highest correlation score may be selected and a determination made as to whether that stored item image information is associated with a cluster. If the stored item image information is part of a cluster, the item included in the processed image may be identified as the type of item represented by the cluster. For example, a cluster may exist for different variations of soup cans e.g., Chicken Noodle, Split Pea, Cream of Corn) from the same manufacturer because the only visually distinguishable features of the soup cans are the descriptions of the variations.

To determine the variation of the item type, the feature arrangement of the processed image may be compared to the distinctive features of each stored item image information of the cluster. As discussed below, the distinctive features of each image of a cluster include only those features of the stored item image information that are not common among the images of the cluster. Continuing with the example of the soup cans, the name of the manufacturer, the manufacturer logo, etc. may all be common among the different variations of the product type and therefor those features not identified as distinctive features. The description of the item variation may be the only visually distinguishing features of the items and thus the only features identified as distinctive features for each stored item image information. These distinctive features may be identified for each stored item image information of the cluster and used in comparison with captured images to determine an item's variation.

As the arrangement of features of the captured images are compared with the distinctive features of each stored item image information of the cluster, a distinctive feature correlation is determined. For example, an image matching algorithm may be utilized to compare the arrangement of features of the processed image with the stored distinctive features of each item image information associated with the cluster to determine the correlation of the feature arrangements with the distinctive features.

Similar to the initial processing, to identify the stored item image information with the highest correlation, the distinctive feature correlation scores resulting from the comparison with the distinctive features identifies how similar the arrangement of features identified from the processed image is to the arrangement of distinctive features included in each of the stored item image information associated with the cluster. Only considering the distinctive features removes the common features of the cluster and provides correlation results focused only on the comparison with the distinctive features. In other implementations, the common features may receive a different weighting than the distinctive features. Without removing and adjusting the weighting of the common features, there may be a high correlation score between the arrangement of features of the processed image and many of the stored item image information of the cluster, as many features are common, By removing the common features (or adjusting the weight), the comparison of the arrangement of features of the processed image with the distinctive features of the stored item image information of the cluster provides discriminating results focused on just the distinctive features. The stored distinctive features with the highest correlation score may be identified as the variation of the item type, and the item identified. In some implementations, a determination may be made as to whether the correlation score(s) meets or exceeds a confidence threshold. The confidence threshold may be any number that specifies a likelihood that the identified item is the actual item.

Image processing may be performed for each image of the item that was captured as the user retrieved the item. Based on the collective item image information, an accuracy score may be determined. The accuracy score may represent how accurate the collective item image information is at accurately identifying the item from the captured images. For example, even if each of the correlation scores do not satisfy the confidence threshold, collectively they may be considered as an accuracy score and a determination made as to whether the accuracy score exceeds an accuracy threshold. If the accuracy score exceeds an accuracy threshold, the user may be notified as to the identity of the retrieved item.

If the identity of the item cannot be confirmed, other inputs may be utilized to determine the identity of the item.

For example, the user may be asked to confirm the identity of the item, a visual code or tag on the item may be read, and/or other user actions may be used to determine the identity of the item. User action may include the user affirmatively identifying the item, placing the item in a tote, cart or other carrier, or performing any other action with respect to the item that can be used to confirm the identity of the item.

The item image information stored in the item images data store and used for identifying items may include an image of the item, the features obtained from the image of the item, the arrangement of features, the date/time that the image was captured, the location within the materials handling facility where the image was captured, a boundary of the item within the image, the pan-tilt-zoom of the image capture device that captured the image, the hardware information for the image capture device that captured the image, an identifier identifying the image capture device, the identity of the associated item, the item type, whether the item image information is part of a cluster, and the like.

In some implementations, if information is presented to the user from the inventory management system 150, such information may be presented via the portable device 205 and/or other output devices positioned within the materials handling facility. The portable device may be used to identify to the user a confirmation of the item removed from the inventory location and/or to request that the user identify the inventory item removed/placed into the inventory location. For example, if the identity of a removed inventory item is not able to be confirmed through image processing and/or other means, the inventory management system 150 may identify the item to the user via a user interface 224 and request confirmation that the identified item corresponds to the actual item. For example, the portable device 205 may identify to the user that the user has removed/picked item A from the inventory location. The user may then confirm the identity of the item, identify how many of those items were removed from the inventory location (picked) and/or identify a different item as the item that was removed from the inventory location.

Figure 3:
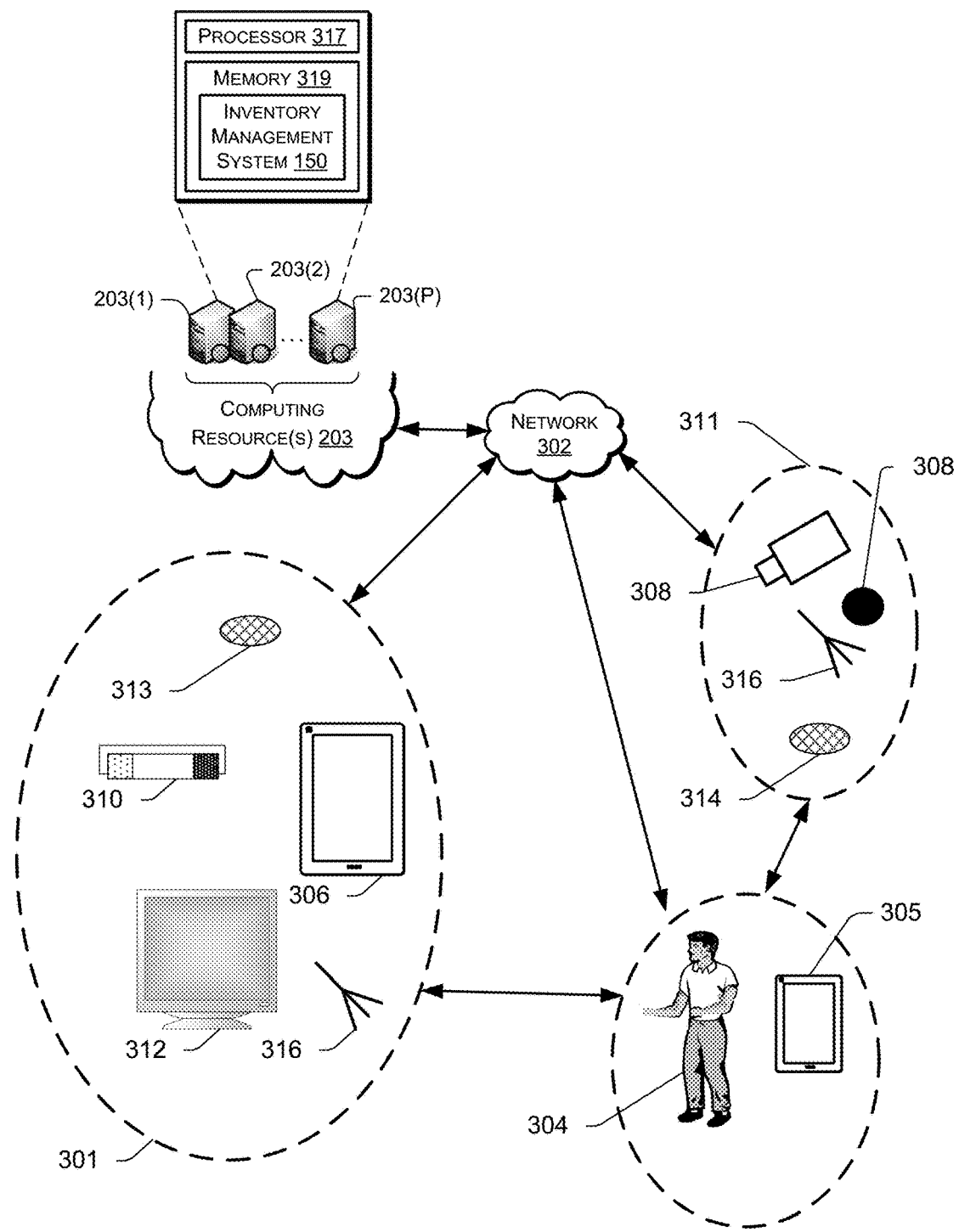
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components over a variety of communication paths. Generally, the inventory management system 150 and/or the materials handling facility may include input components 311, output components 301 and computing resource(s) 203. The input components 311 may include a camera 308, microphone 314, antenna 316, sensor (not shown), scale (not shown), light curtain (not shown) or any other component that is capable of receiving input about the surrounding environment, from the user of the portable device and/or from the portable device. The output components 301 may include a projector 310, a portable device 305, a display 312, an antenna 316, a radio (not shown), speakers 313 and/or any other component that is capable of providing output.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 311, output components 301 and/or directly with the portable device 305 and/or the user 304.

As illustrated, the computing resource(s) 203 may be remote from the environment and implemented as one or more servers 203(1), 203(2), . . . , 203(P) and may, in some instances form a portion of a network-accessible computing platform implemented as a computing infrastructure of processors, storage, software, data access, and so forth that is maintained and accessible by components/device of the inventory management system 150 via a network 302, such as the Internet. For example, the computing resources 203 may process images to determine whether an item has been removed from an inventory location or placed into an inventory location. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 203(*l*)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some implementations, the inventory management system 150 and/or the item images data store, may be utilized to process images received from multiple material handling facilities. For example, the remote computing resources may communicate over the network 302 with multiple material handling facilities and receive images from those materials handling facilities for processing. In some implementations, a single item images data store may be maintained for inventory items of all of the multiple materials handling facilities. For example, if some inventory items are common across all materials handling facilities, the item images data store may maintain item image information for that inventory item and use that item image information for processing images received from any of the materials handling facilities. In other implementations, a separate item images data store may be maintained for each materials handling facility. When an image is received it may be determined what materials handling facility provided the image and the corresponding item images data store may be utilized when processing the image.

Figure 4:
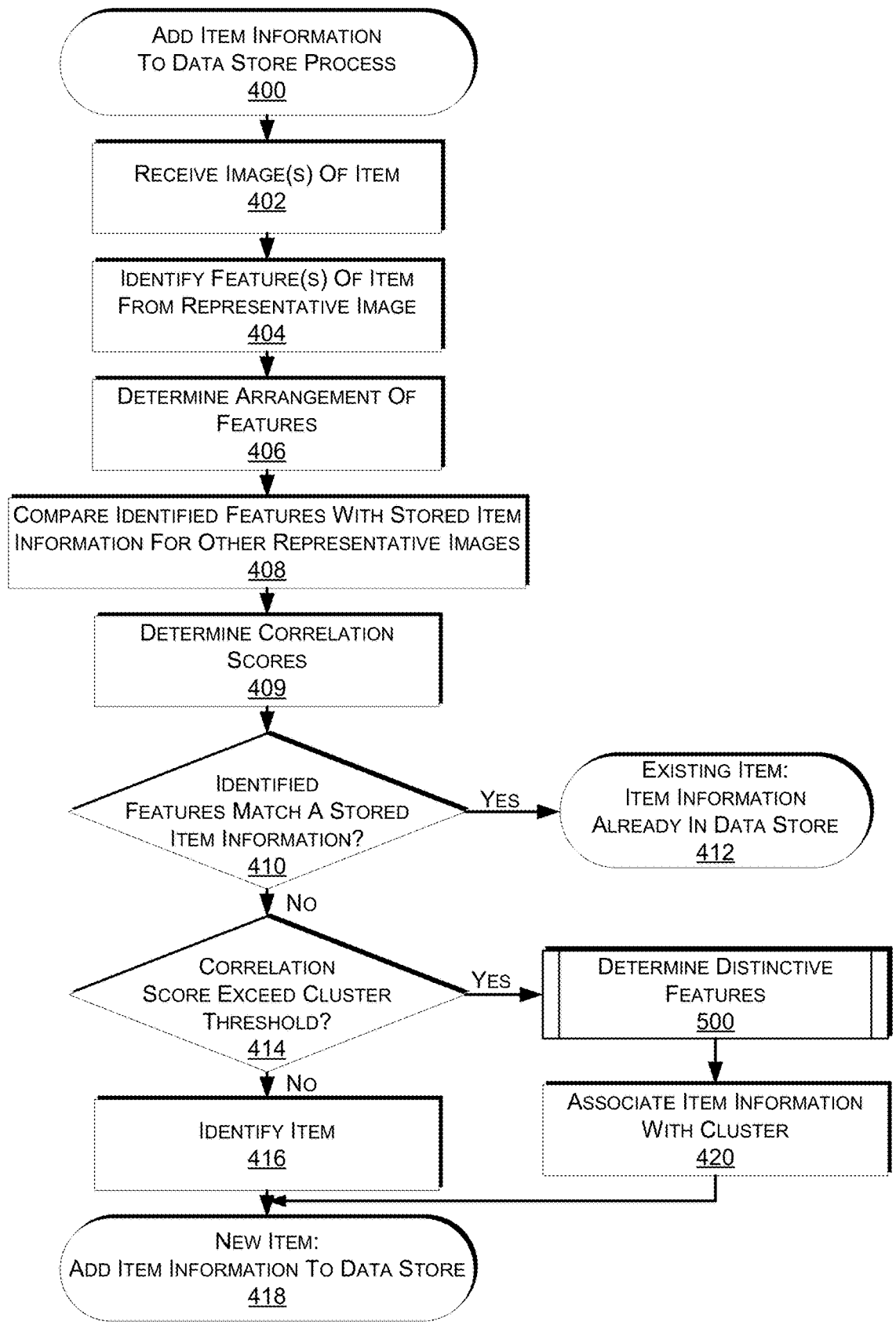
FIG. 4 depicts a flow diagram of an example process for adding item image information to an item images data store, according to some implementations.

FIG. 4 depicts a flow diagram of an example process for adding item image information to the item images data store, according to some implementations. The process of FIG. 4 and each of the other processes discussed herein may be implemented in hardware, software, or a combination thereof. In the context of software, the described operations represent computer-executable instructions stored on one or more computer-readable media that, when executed by the one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins when images of an item are being received for use in possibly adding item image information to the item images data store, as in 402. For example, when an item is received into a materials handling facility at the receiving area 120, images of the item may be captured and provided to the example process 400. For example, when items are received at the receiving area of a materials handling facility they are identified by the receiving agent. The receiving agent may scan a bar code or other identifier to identify the item that is being received. During receive, one or more images of the item(s) may be captured. In some implementations, the capturing of images may be performed at different stages of the receive process. For example, if the items are being segmented or otherwise separated for storage in the storage area, images may be captured as the items are separated. In other implementations, images may be captured when the items have completed receive but before they are placed into a storage area. In some implementations, images of an item may be captured in a controlled environment such that the images are taking from a known distance, pan, tilt, zoom and lighting conditions.

Regardless of when and/or how the images are captured, a representative image for the item is selected and processed to identify features of the item, as in 404, A representative image may be any image of the item. For example, the representative image may be the frontal view of the item, a side view of the item, a back view of the item, etc. The representative image is processed to identity features of an item in the image. In some implementations, the image may be processed in grey-scale to identify features. Features of an item may be anything or a combination of things that are identifiable for that item. For example, a feature may be the shape of the item, a color of the item, the label or logo on the item, the wording on the item, a symbol on the item, a character on the item, a word on the item, a number on the item, a texture of the item, a gradient of the item, a shape of the item, a reflectivity of the item, an edge of the item, and the like. For example, "Organic Dressing" identified on a label positioned on a tall slender bottle may be a feature. As will be appreciated, depending on the orientation of the item when the image is captured, different features may be identified. To illustrate, an image of a can of soup may be processed in grey-scale to identify features, such as the manufacturer's logo and the name of the variation of the soup. In some implementations, character recognition may be utilized to identify characters or words included in the image. Once the features of the image are identified an arrangement of the features is determined. The arrangement of features identifiers the location in the image of each feature with respect to other features. For example, if the image is processed in two-dimensions, the location of the identified features may be associated with an X-Y position on the two-dimensional grid overlaid on the image.

An arrangement of the identified features of the representative image may then be determined, as in 406. The arrangement may be a two dimensional relationship of the features with respect to each other as captured in the representative image. In other implementations, the arrangement of features may be a three-dimensional arrangement with respect to each other as captured in the representative image.

The arrangement of the identified features is then compared with item image information stored in the item images data store for representative images of other items, as in 408. As discussed above, the item image information stored in the item images data store includes arrangements of features for images that have previously been identified and associated with the item. As discussed above, each inventory item may have multiple images and corresponding item image information stored in the item images data store. The arrangement of features identified for the captured image may be compared to stored item image information and a correlation score determined for each comparison, as in 409. In some implementations, a representative image (e.g., frontal view, side view, back view) may be designated for each item such that all items utilize a common orientation for the representative image (e.g., frontal view) and a correlation score determined for each representative image. The correlation score identifies the similarity between the arrangement of features identified in the captured image and the arrangement of features in the stored item image information.

Based on the comparisons and the resulting correlation scores, a determination is made as to whether the arrangement of features for the received representative image match stored item image information for another representative image, as in 410. For example, if there is a 100% correlation between the arrangement of features of the received image and the stored item image information of another representative image, then it may be determined that the item image information for the item already exists in the data store, and the process completes, as in 412.

If the arrangement of features of the received representative image does not completely correspond with any stored item image information, the stored item image information that results in the highest correlation score may be selected for that item and a determination made as to whether the correlation score exceeds a cluster threshold, as in 414. A cluster threshold may be any determined number or score used to determine if the received image of the item is similar enough (e.g., same item type) to stored item image information that they should be considered as a cluster. For example, if the arrangement of features of the received image have a high correlation with stored item image information, it may be determined that the two items are of the same type and the corresponding item image information should be clustered.

If it is determined that the cluster threshold is not exceeded, the item is identified, as in 416. Many different techniques may be used to identify an item. For example, the item may be identified by a user as part of the receive process while the images of the item are being captured. In other examples, the item may be identified by processing the representative image and performing optical character recognition on the image to determine the name and/or type of the item. Once the item is identified item image information for the item is added to the item images data store, as in 418.

Returning to decision block 414, if it is determined that the correlation score exceeds the cluster threshold, the determine distinctive features sub-process is performed, as in 500, and discussed further below with respect to FIG. 5. Completion of sub-process 500 returns distinctive features for the received images of the item and/or other cluster information. Upon receiving the results from sub-process 500, item image information for the received image is associated with the cluster, as in 420, and added to the item images data store, as in 418. The item image information may include the identity of the item, the arrangement of features for the image, the distinctive features, etc.

While the example process 400 discusses processing representative images, in some implementations, multiple images of an item may be captured and provided to the example process 400. In such an example, the features of each image, and the arrangement of those features, may be determined and added to the item images data store if it is determined from the representative image that the item is a new item. Likewise, as discussed below with respect to FIG. 5, the distinctive features for each image may also be determined and included as part of the item image information for each image that is stored in the item images data store. Such information may be utilized by the example process 600, discussed below with respect to FIG. 6.

Figure 5:
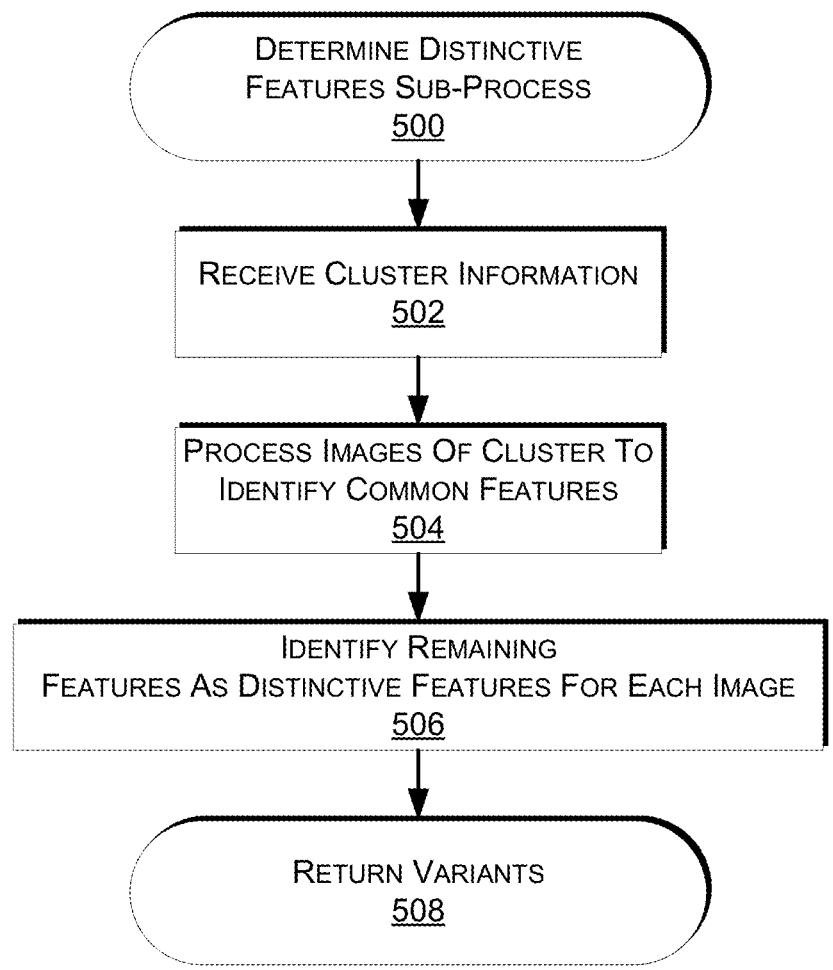
FIG. 5 depicts a flow diagram of an example sub-process for determining distinctive features among a cluster of images, according to some implementations.

FIG. 5 depicts a flow diagram of an example sub-process 500 for determining distinctive features for images of a cluster, according to some implementations. The example process 500 begins by receiving cluster information. For example, if the example process has identified a representative image and saved item image information with a correlation score above the cluster threshold, the example process 500 may receive all images associated with the two items. Each item may have images from multiple positions for the item that are stored in the item images data store. Likewise, in some instances, there may be multiple images and/or items associated with a cluster. In such cases, all images and item image information may be received by the example sub-process 500.

Once received, the item image information for each item of the cluster is compared to identify common features, as in 504. For example, item image information maintained in the item images data store may include the arrangement of features of each image. Those arrangements of features may be compared to identify common features. In some implementations, there may be one set of common features for all images of the cluster. In other implementations, there may be multiple sets of common features, each set corresponding to two or more images of the cluster. For example, images taken from a frontal view may have one set of common features while images taken from a rear view may have another set of common features.

For each image of the cluster, the common features may be suppressed such that only the distinctive feature features and the arrangement of those distinctive features remain, as in 506. In other implementations, the common features may be retained and given a lower weighting (or the distinctive features given a higher weighting). The distinctive features for an image may be maintained as part of the item image information for each item. Once the distinctive features for each image of the cluster are identified and included in the corresponding item image information, the distinctive features are returned, as in 508.

Figure 6A:
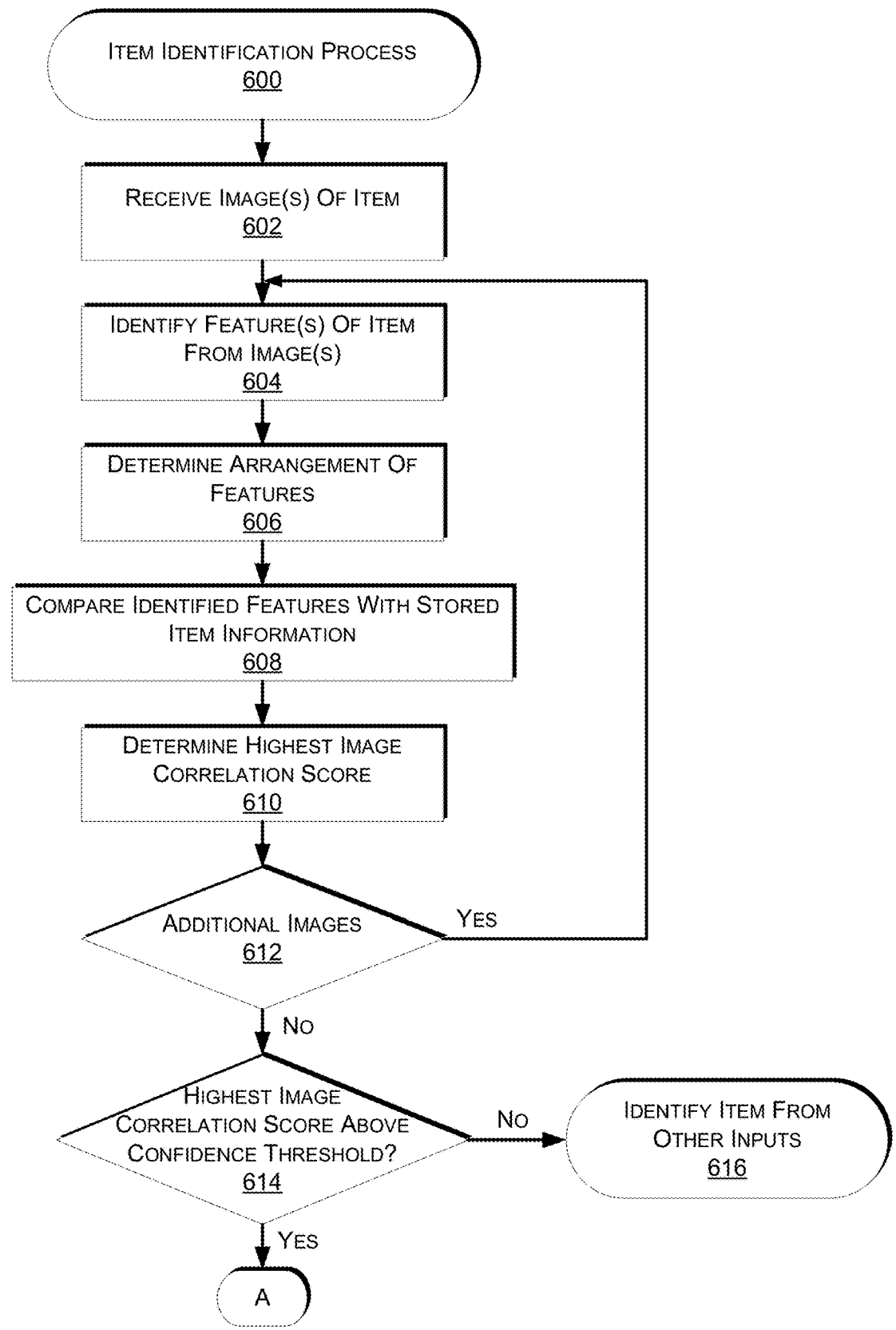
FIGS. 6A-6B depict a flow diagram of an example process for identifying an item, according to some implementations.
Figure 6B:
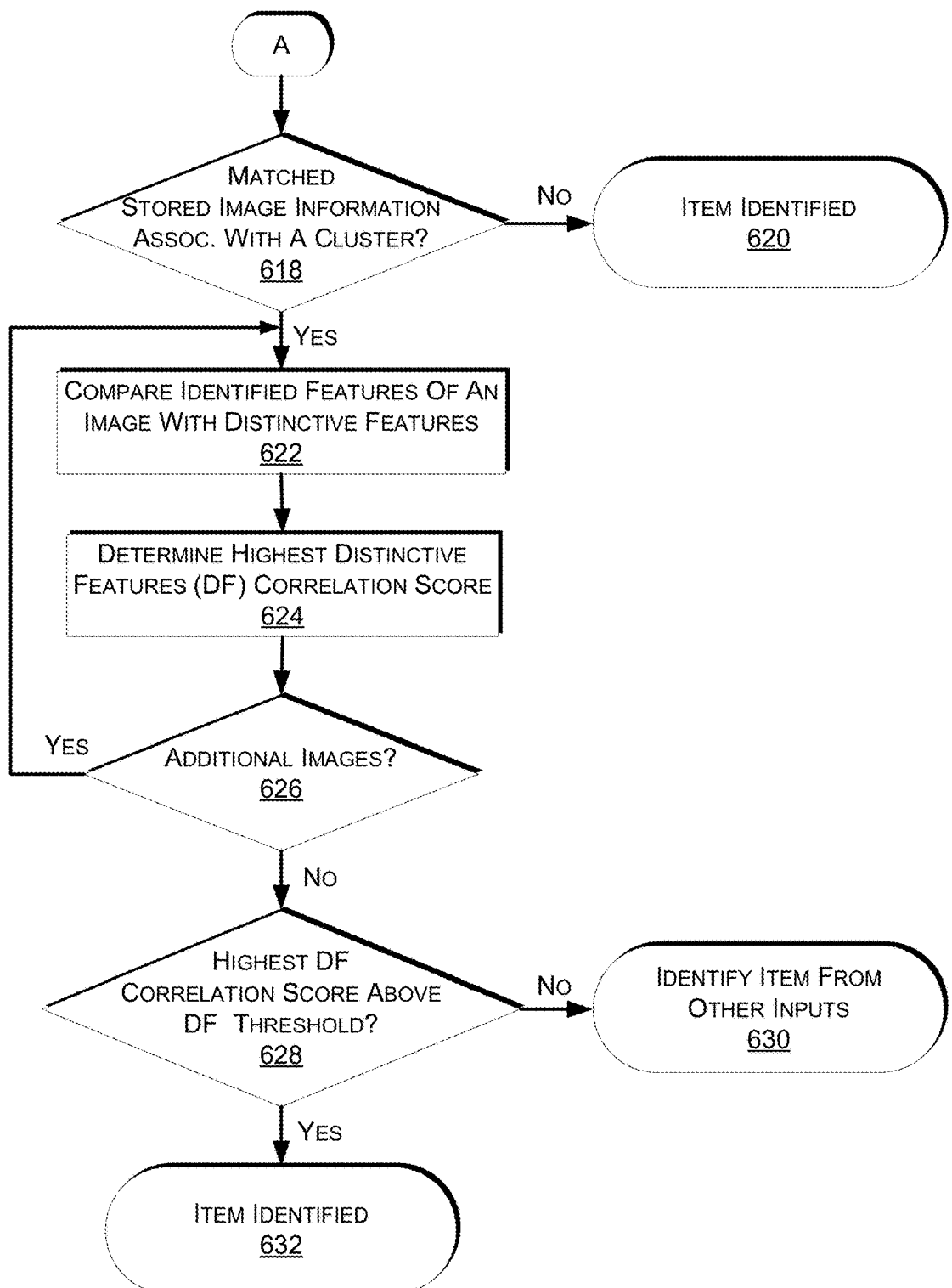

FIGS. 6A-6B depicts a flow diagram of an example process 600 for identifying items from captured images, according to some implementations. The example process 600 begins upon receipt of one or more captured images of an item, as in 602. A received image is processed to identify features of an item in the image. In some implementations, the image may be processed in grey-scale to identify features. Features of an item may be anything or combination of things that are identifiable for that item. For example, a feature may be the shape of the item, a color of the item, the label or logo on the item, the wording on the item, a symbol on the item, a character on the item, a word on the item, a number on the item, a texture of the item, a gradient of the item, a shape of the item, a reflectivity of the item, an edge of the item, and the like. For example, "Organic Dressing" identified on a label positioned on a tall slender bottle may be a feature. As will be appreciated, depending on the orientation of the item when the image is captured, different features may be identified. As such, each image of an item may include multiple, and/or different features.

An arrangement of the identified features may then be determined, as in 606. The arrangement may be a two dimensional relationship of the features with respect to each other as captured in the image. In other implementations, the arrangement of features may be a three-dimensional arrangement with respect to each other as captured in the image.

The arrangement of the identified features is then compared with item image information stored in the item images data store, as in 608. As discussed above, the item image information stored in the item images data store includes arrangements of features for images that have previously been identified and associated with the item. A captured image may be processed to identify features, determine the arrangement of those features and that arrangement of features may be compared with the arrangement of features stored as part of the item image information for previously captured images of items. As discussed above, each inventory item may have multiple images and corresponding item image information stored in the item images data store. The arrangement of features identified for the captured image may be compared to stored item image information and a correlation score determined for each comparison, as in 608. Based on the comparisons, the stored item image information that results in the highest correlation score may be selected for that item, as in 610. The correlation score identifies the similarity between the arrangement of features identified in the captured image and the arrangement of features in the stored item image information.

After processing the image and determining correlation scores, a determination is made as to whether there are additional images to process, as in 612, If it is determined that there are additional images to process, the example process 600 returns to block 604 and continues. If there are no additional images to process, the example process 600 determines if the highest image correlation score is above a confidence threshold, as in 614. In some implementations, the correlation score from multiple images may, be combined to generate a correlation score. For example, multiple images of an item may be captured and even though individual image correlation scores for those images may not satisfy the confidence threshold, if there are multiple images that have a correlation score that is near the confidence threshold, the collective may provide enough confidence that the item can be identified. As another example, if three images of an item are captured and two of those images return a correlation score that exceeds the confidence threshold but the third does not, it may still be determined that the item is identifiable based on the two images that exceed the confidence threshold.

If it is determined that correlation score does not exceed the confidence threshold, the item is identified from other inputs, as in 616. For example, a user may identify the item, an active tag may be detected and used to identify the item, if the item is removed from an inventory location, the item known to be at the inventory location may be used to identify the item.

If it is determined that the correlation score does exceed the confidence threshold, a determination may be made as to whether the item image information that resulted in the highest image correlation score is associated with a cluster, as in 618. If the stored item image information is not associated with a cluster, the item is identified and the process completes, as in 620. However, if it is determined that the item image information is associated with a cluster, the arrangement of the identified features of the captured image are compared to the distinctive features of each item image information associated with the cluster, as in 622, As discussed above, the item image information stored in the item images data store that is associated with a cluster includes distinctive features. The distinctive features identify, for each image of the cluster, the arrangement and features that are not common to the other images of the cluster. The distinctive features may be, for example, the description of the variation of the item. The arrangement of the features of the captured image may be compared with the arrangement of distinctive features stored as part of the item image information for previously captured images of items. As discussed above, each inventory item may have multiple images and corresponding item image information, each with distinctive features, stored in the item images data store. The arrangement of features identified for the captured image may be compared to stored distinctive features and a distinctive feature correlation score determined for each comparison. Based on the comparisons, the stored item image distinctive features that results in the highest correlation score may be selected for that item, as in 624. The distinctive features correlation score identifies the similarity between the arrangement of features identified in the captured image and the arrangement of distinctive features in the stored item image information.

After processing the image and determining distinctive features correlation scores, a determination is made as to whether there are additional images to process, as in 626. If it is determined that there are additional images to process, the example process 600 returns to block 622 and continues. If there are no additional images to process, the example process 600 determines if the highest distinctive features correlation score is above a confidence threshold, as in 628. In some implementations, the distinctive features correlation score from multiple images may be combined to generate a distinctive features correlation score. For example, multiple images of an item may be captured and even though individual distinctive features correlation scores for those images may not satisfy the distinctive features confidence threshold, if there are multiple images that have a distinctive features correlation score that is near the distinctive features confidence threshold, the collective may provide enough confidence that the item can be identified. As another example, if three images of an item are captured and two of those images return a distinctive features correlation score with distinctive features that exceeds the distinctive features confidence threshold but the third does not, it may still be determined that the item type and variation is identifiable based on the two images that exceed the distinctive features confidence threshold.

If it is determined that the highest distinctive features correlation score does not exceed the distinctive features confidence threshold, the item is identified from other inputs, as in 630. For example, a user may identify the item, an active tag may be detected and used to identify the item, if the item is removed from an inventory location, the item known to be at the inventory location may be used to identify the item. In one implementation, the user may be provided a list of potentially matching items from the cluster and asked to select the appropriate variation.

If it is determined that the highest image correlation score with the distinctive features does exceed the distinctive features confidence threshold, the item associated with the item image information for those distinctive features is identified as the item, as in 632. By comparing the item image information of the received image again with the distinctive features for images of a cluster, the results focus on only the information that is different (the distinctive features) among the images of the cluster such that the appropriate item is identified.

Figure 7:
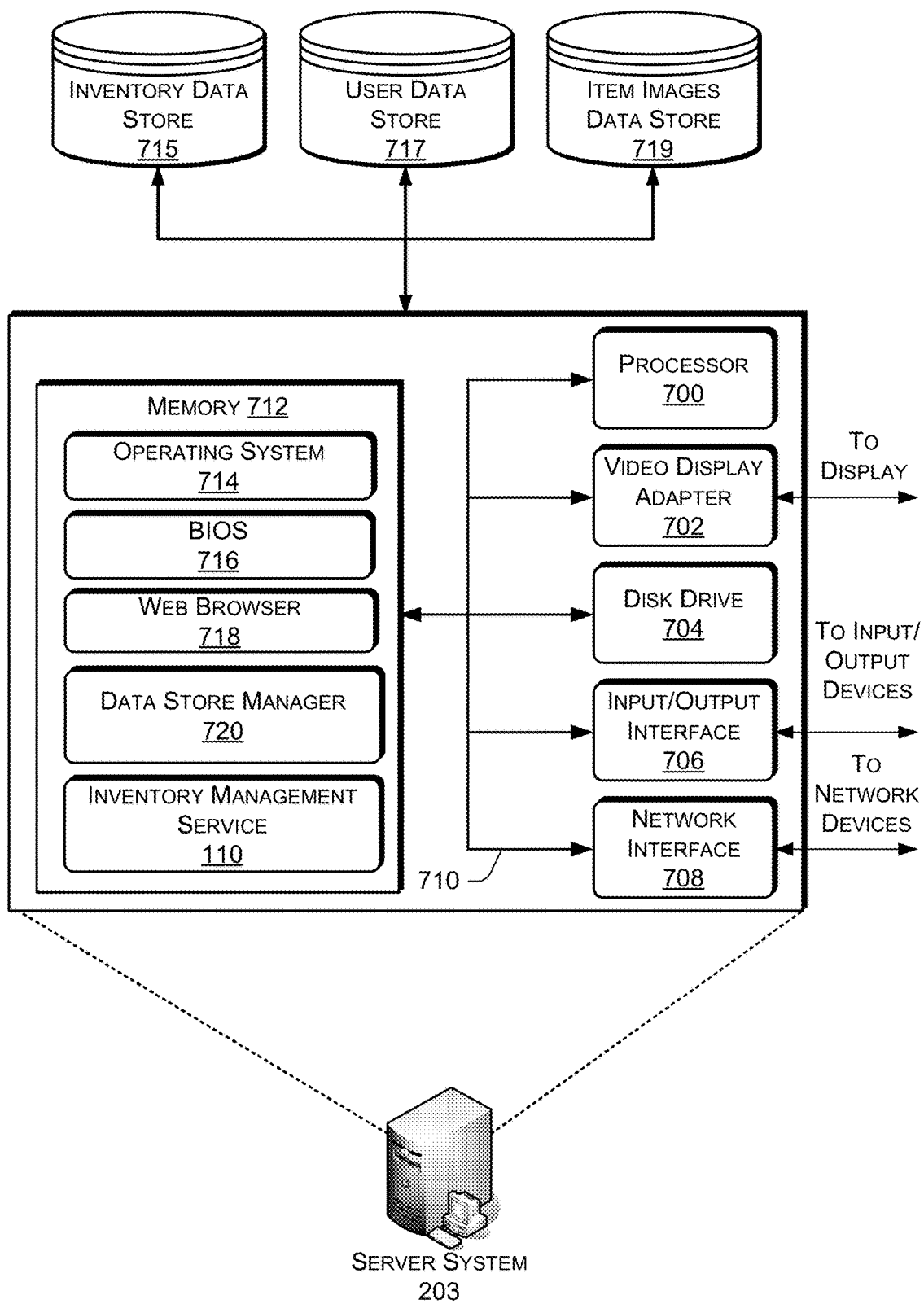
FIG. 7 is a block diagram of an illustrative implementation of a server system that may be used with various implementations.

FIG. 7 is a pictorial diagram of an illustrative implementation of a server system, such as the server system 203 that may be used in the implementations described herein. The server system 203 may include a processor 700, such as one or more redundant processors, a video display adapter 702, a disk drive 704, an input/output interface 706, a network interface 708, and a memory 712. The processor 700, the video display adapter 702, the disk drive 704, the input/output interface 706, the network interface 708, and the memory 712 may be communicatively coupled to each other by a communication bus 710.

The video display adapter 702 provides display signals to a local display (not shown in FIG. 7) permitting an operator of the server system 203 to monitor and configure operation of the server system 203. The input/output interface 706 likewise communicates with external input/output devices not shown in FIG. 7, such as a mouse, keyboard, scanner, or other input and output devices that can be operated by an operator of the server system 203. The network interface 708 includes hardware, software, or any combination thereof, to communicate with other computing devices. For example, the network interface 708 may be configured to provide communications between the server system 203 and other computing devices via the network 202, as shown in FIG. 2.

The memory 712 generally comprises random access memory (RAM), read-only memory (ROM), flash memory, and/or other volatile or permanent memory. The memory 712 is shown storing an operating system 714 for controlling the operation of the server system 203. A binary input/output system (BIOS) 716 for controlling the low-level operation of the server system 203 is also stored in the memory 712.

The memory 712 additionally stores program code and data for providing network services that allow the inventory management system 150 to process images and automatically update the item images data store based on verified items. Accordingly, the memory 712 may store a browser application 718. The browser application 718 comprises computer executable instructions, that, when executed by the processor 700 generate or otherwise obtain configurable markup documents such as Web pages. The browser application 718 communicates with a data store manager application 720 to facilitate data exchange between the inventory data store 715, the user data store 717 and/or the item images data store 719.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 715, 717, 719 as needed to execute aspects of the inventory management system 150.

The data stores 715, 717, 719 can include several separate data tables, databases or other data storage mechanisms and media for storing data relating to a particular aspect. For example, the data stores 715, 717, 719 illustrated include mechanisms for inventory information, user information, item image information, etc. which can be used to identify an item removed from an inventory location and/or placed into an inventory location.

It should be understood that there can be many other aspects that may be stored in the data stores 715, 717, 719. The data stores 715, 717, 719 are operable, through logic associated therewith, to receive instructions from the server system 203 and obtain, update or otherwise process data in response thereto.

The memory 712 may also include the inventory management system 150, discussed above. The inventory management system 150 may be executable by the processor 700 to implement one or more of the functions of the server system 203. In one implementation, the inventory management system 150 may represent instructions embodied in one or more software programs stored in the memory 712. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction in FIG. 7 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
a memory coupled to the one or more processors and storing program instructions that when executed by the one or more processors cause the one or more processors to at least:
process an image of an item to generate a first item image information, wherein the first item image information includes:
a plurality of features of the item identified in the image; and
an arrangement of the plurality of features;
determine that the first item image information corresponds with a cluster of stored item information that includes a second item image information representative of a second item and a third item image information representative of a third item, wherein the second item image information includes a distinctive feature identifying a difference between the second item represented in the second item image information and the third item represented in the third item image information;
determine a distinctive features correlation score between the first item image information and the distinctive feature;
determine that the distinctive features correlation score exceeds a distinctive features threshold; and
identify the item as the second item associated with the second item image information.

2. The computing system of claim 1, wherein the program instructions that when executed by the one or more processors to cause the one or more processors to determine that the first item image information corresponds with the cluster further include instructions that, when executed by the one or more processors, further cause the one or more processors to at least:
determine a correlation score between the first item image information and the second item image information; and
determine that the correlation score exceeds a threshold.

3. The computing system of claim 1, wherein the distinctive feature of the second item is at least one of a shape of the item, a color of the item, a logo on the item, a label on the item, a word on the item, a symbol on the item, a character on the item, a number on the item, a texture of the item, a gradient of the item, a shape of the item, a reflectivity of the item, or an edge of the item.

4. The computing system of claim 1, wherein the first item image information further includes at least one of the image, a time the image was captured, a location within a materials handling facility where the image was captured, a boundary of the item within the image, or an image capture device identifier identifying the image capture device that captured the image.

5. A computer-implemented method to identify an item among a plurality of item variants, the method comprising:
processing an image of an item of a first item type to determine an arrangement of a first plurality of features of the item as represented in the image;
determining that the first plurality of features are correlated with a second plurality of features stored in a data store, the second plurality of features corresponding to a cluster representative of a plurality of item variants of an item type, wherein the plurality of item variants includes:
a first item variant of the item type that is represented by a first distinctive features of the first item variant; and
a second item variant of the item type that is represented by a second distinctive features of the second item variant;
comparing the first plurality of features with the first distinctive features to determine a first distinctive features correlation score;
comparing the first plurality of features with the second distinctive features to determine a second distinctive features correlation score;
determining, based at least in part on the first distinctive features correlation score and the second distinctive features correlation score, that the first distinctive features correlation score exceeds a threshold; and
based at least in part on determining that the first distinctive features correlation score exceeds the threshold, identifying the item as the first item variant of the item type.

6. The computer-implemented method of claim 5, wherein the image of the item is captured while the item is being removed from an inventory location or placed at the inventory location.

7. The computer-implemented method of claim 5, wherein processing the image further includes:
generating a first item image information that includes the first plurality of features, an identification of an image capture device that obtained the image, an identification of a time when the image was captured, or information on pan-tilt-zoom information for the image capture device.

8. The computer-implemented method of claim 5, further comprising:
processing a second image of the item to determine a second arrangement of a second plurality of features of the item as represented in the second image;
comparing the second plurality of features with the first distinctive features to determine a third distinctive features correlation score;
determining, that the third distinctive features correlation score exceeds the threshold; and
wherein identifying the item as the first item variant of the item type is further based at least in part on determining that the third distinctive features exceed the threshold.

9. The computer-implemented method of claim 8, wherein the image and the second image of the item are captured while the item is being removed from an inventory location or placed at the inventory location.

10. The computer-implemented method of claim 5, wherein the first distinctive features identify a first arrangement of distinctive features corresponding to the first item variant that is different than a second arrangement of features corresponding to the second item variant.

11. The computer-implemented method of claim 5, wherein determining that the first plurality of features are correlated with a second plurality of features stored in the data store further includes:
determining a correlation score between the first plurality of features of the item and the second plurality of features; and
determining that the correlation score exceeds a correlation threshold.

12. The computer-implemented method of claim 11, wherein determining the correlation score includes comparing the arrangement of the first plurality of features with a second arrangement of the second plurality of features.

13. The computer-implemented method of claim 11, further comprising:
processing a second image of the item to determine a fourth plurality of features of the item as represented in the second image;
determining a second correlation score between the fourth plurality of features of the item and the second plurality of features; and
determining that the second correlation score exceeds the correlation threshold.

14. The computer-implemented method of claim 5, wherein the arrangement of the first plurality of features of the item includes a two dimensional relationship of a feature of a plurality of features of the item with respect to other features of the plurality of features of the item.

15. A computing system, comprising:
one or more processors; and
a memory storing program instructions that when executed by the one or more processors cause the one or more processors to at least:
process an image of an item of a first item type to generate a first item image information, wherein the first item image information includes:
a first plurality of features of the item identified in the image; and
an arrangement of the first plurality of features;
determine that the first item image information is correlated with a cluster of stored item information representative of a plurality of item variants of an item type, wherein the plurality of item variants includes:
a first item variant of the item type that is represented by a first distinctive features of the first item variant; and
a second item variant of the item type that is represented by a second distinctive features of the second item variant;
determine a distinctive features correlation score between the first item image information and the first distinctive features to determine a distinctive features correlation score; and
identify, based at least in part on the distinctive features correlation score, the item as the first item variant of the item type.

16. The computing system of claim 15, wherein the arrangement of the first plurality of features of the item includes a three-dimensional relationship of a feature of the first plurality of features of the item with respect to other features of the first plurality of features of the item.

17. The computing system of claim 15, wherein the program instructions that when executed by the one or more processors further cause the one or more processors to at least:
associate the first plurality of features of the item with at least one of the first item variant or the cluster.

18. The computing system of claim 15, wherein the program that, when executed by the one or more processors, further cause the one or more processors to at least:
determine a correlation score between the item image information and a second item image information; and
determine that the correlation score exceeds a threshold.

19. The computing system of claim 15, wherein the first item image information further includes at least one of the image, a time the image was captured, a location within a materials handling facility where the image was captured, a boundary of the item within the image, or an image capture device identifier identifying the image capture device that captured the image.

20. The computing system of claim 15, wherein the program instructions that when executed by the one or more processors further cause the one or more processors to at least:
process a second image of the item to determine a second arrangement of a second plurality of features of the item as represented in the second image, wherein the image and the second image are generated when the item is removed from an inventory location or placed at the inventory location;

compare the second plurality of features with the first distinctive features to determine a third distinctive features correlation score; and
wherein the identification is further based at least in part on the third distinctive features correlation score.

\* \* \* \* \*